United States Patent [19]
Kraakman

[11] Patent Number: 4,707,072
[45] Date of Patent: Nov. 17, 1987

[54] AUTO-ALIGNING OPTICAL FIBER CONNECTOR

[75] Inventor: Hillebrand J. J. Kraakman, Eindhoven, Netherlands

[73] Assignee: U.S. Philips Corp., New York, N.Y.

[21] Appl. No.: 799,703

[22] Filed: Nov. 19, 1985

[30] Foreign Application Priority Data

Dec. 18, 1984 [NL] Netherlands ............ 8403829

[51] Int. Cl.⁴ .............................................. G02B 6/38
[52] U.S. Cl. ................................................ 350/96.21
[58] Field of Search ............ 350/96.20, 96.21, 96.22, 350/96.23

[56] References Cited

U.S. PATENT DOCUMENTS

| | | | |
|---|---|---|---|
| 4,193,665 | 3/1980 | Arnold | 350/96.22 |
| 4,289,374 | 9/1981 | Franken et al. | 350/96.20 |
| 4,567,650 | 2/1986 | Balyasny et al. | 350/96.20 |

FOREIGN PATENT DOCUMENTS

| | | | |
|---|---|---|---|
| 0025647 | 2/1977 | Japan | 350/96.21 |
| 8304318 | 12/1983 | PCT Int'l Appl. | |

Primary Examiner—Eugene R. Laroche
Assistant Examiner—James C. Lee
Attorney, Agent, or Firm—Marc D. Schechter

[57] ABSTRACT

The end portions of optical fibers to be connected are accommodated in envelopes having a circularly-cylindrical outer surfaces. A connector includes a coupling sleeve with a central cavity which extends in a longitudinal direction. The central cavity is shaped as a prism having a triangular cross-section. An inscribed circle has a diameter which is smaller than the diameter of the outer surfaces of the envelopes. The walls of the central cavity are formed by free end portions of three leaf springs. The non-free ends of the leaf springs are regularly distributed around the circumference of the coupling sleeve and are secured to the wall of a housing which encloses the central cavity. The planes of the leaf springs enclose angles of approximately 60° with respect to each other. When the envelopes are inserted into the central cavity, the three springs of the central cavity are independently deflected outward, so that the two outer surfaces are clamped in the central cavity with their axes aligned.

4 Claims, 3 Drawing Figures

AUTO-ALIGNING OPTICAL FIBER CONNECTOR

BACKGROUND OF THE INVENTION

The invention relates to a connector for optically coupling at least one pair of optical fibers. The end portions of the fibers are accommodated in envelopes having circularly-cylindrical outer surfaces. The connector includes a coupling sleeve for coaxially accommodating at least the free end portions of the two envelopes. The sleeve optically connects the optical fibers via their end faces. The coupling sleeve includes a central cavity which extends in a longitudinal direction. The central cavity is shaped as a prism with a triangular cross-section. An inscribed circle has a diameter which is smaller than the diameter of the outer surface of the envelope. The walls of the central cavity are disposed so as to be resilient in the radial direction so that the envelopes can be clamped in the central cavity.

A connector of this kind is described in U.S. Pat. No. 4,193,665. The coupling sleeve of this known connector consists of a thin-walled cylindrical tube whose walls are deformed in their mid-region so as to form the prismatic central cavity. Such coupling sleeves are particularly suitable for optically coupling fiber bundles in which a large number of optical fibers are accommodated in a common envelope.

In applications where each end portion of an optical fiber is accommodated in an envelope, the accuracy with which the two envelopes are positioned and retained on a common axis is usually insufficient, notably when so-called monomode fibers are concerned. This is probably due to the fact that when one of the three walls of the central cavity is deformed at a point, such deformation may influence all points of all three walls.

SUMMARY OF THE INVENTION

It is an object of the invention to provide an optical fiber connector in which the three walls of the central cavity of the coupling sleeve are substantially independently resilient, so that the fiber envelopes are more accurately positioned in the central cavity. To this end, in the connector according to the invention, the walls of the central cavity are formed by free end portions of three leaf springs. The non-free ends of the leaf spring are regularly distributed around the circumference of the coupling sleeve and are secured to the wall of a housing which encloses the central cavity. The planes of the leaf springs enclose angles of approximately 60° with respect to each other.

In order that the portions of each leaf spring which cooperate with the two envelopes to be introduced into the central cavity may be substantially independent of each other, in a preferred embodiment of the connector according to the invention, approximately halfway along the central cavity each leaf spring is interrupted by a cut. Each cut extends in the radial direction from the free end to approximately the wall of the housing.

The coupling sleeve has a high mechanical stability and can be very inexpensively manufactured in a further preferred embodiment in which the leaf springs and the housing are made from one piece of material. To this end, the coupling sleeve can be manufactured, for example from a bar of solid material by spark erosion, or it can be extruded.

DESCRIPTION OF THE PREFERRED EMBODIMENTS

Figure 1:
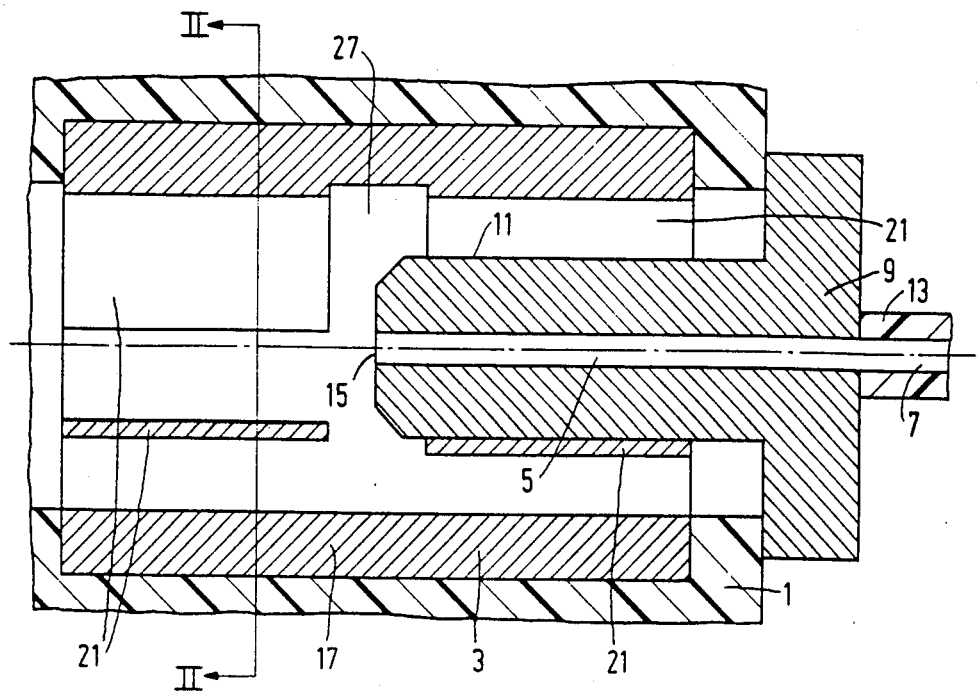
FIG. 1 is a longitudinal sectional view of an embodiment of a connector according to the invention shown accommodating an envelope of an end portion of an optical fiber.

The connector for optically coupling a pair of optical fibers which is partly shown in FIG. 1 includes a connector housing 1, for example made of plastic. A coupling sleeve 3 is secured in housing 1. The connector housing 1 itself is known, and because it is of no importance for a proper understanding of the present invention, it is merely schematically indicated in FIG. 1.

FIG. 1 shows an end portion 5 of an optical fiber 7 which is accommodated in an envelope 9 having a circularly-cylindrical outer surface 11. The protective coating 13 surrounding the optical fiber 7 has been removed from the end portion 5. End portion 5 is secured in the envelope 9, for example, by glue (not shown). The outer surface 11 of the envelope 9 is made substantially concentric with the light-conductive core (not shown) of the fiber 7, for example by using the method described in U.S. Pat. No. 4,289,374. The end face 15 of the optical fiber 7 is polished and is perpendicular to the axis of the outer surface 11.

The coupling sleeve 3 includes a tubular housing 17 (see also FIG. 2) in which there is provided a central cavity 19. Cavity 19 extends in the longitudinal direction of the coupling sleeve 3, and is bounded by three walls 21. Walls 21 are formed by the free end portions of three leaf springs whose non-free ends are attached to the wall of the housing 17 so as to be integral therewith.

The planes of the three leaf springs 21 enclose angles of approximately 60° with respect to each other. The locations at which the leaf springs are attached to housing 17 are regularly distributed around the circumference of the coupling sleeve 3 at angular distances of approximately 120°. As a result, the central cavity 19 is shaped as a prism whose cross-section has the form of a triangle.

Figure 2:
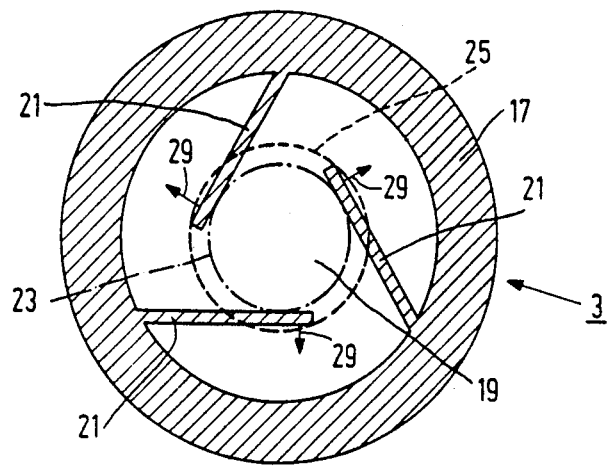
FIG. 2 is a cross-sectional view of a part of the connector, taken along the line II—II in FIG. 1.

A circle 23 inscribed in cavity 19 bounded by walls 21 is denoted by a dash/dot line in FIG. 2. The diameter of the inscribed circle 23 is smaller than the diameter of the circularly-cylindrical outer surface 11 of the envelope 9 (whose circumference is denoted by a dashed circle 25 in FIG. 2 for the purpose of comparison).

Approximately halfway along the central space 19, each leaf spring 21 is interrupted by a cut 27 which extends in the radial direction from the free end of the leaf spring to approximately the wall of the housing 17. As a result of this cut, each leaf spring consists of two independently resilient portions which are situated in different halves of the coupling sleeve 3.

When the free end portion of an envelope 9 with an end portion 5 of an optical fiber 7 is introduced into the central cavity 19 of the coupling sleeve 3 from the right-hand side (see FIG. 1), the right-hand portions of the three leaf springs are resiliently deflected outward to accommodate the outer surface 11 of the envelope. Due to this movement (denoted by arrows 29 in FIG. 2) the cross-section of the central cavity 19 is increased so that the inscribed circle 23 is replaced by the inscribed circle 25. Circle 25 has the same center as circle 23 but has a diameter equal to the diameter of the outer surface 11. The envelope 9 is thus clamped in the central cavity 19 with its axis coincident with the axis of the central cavity.

When the free end portion of a second envelope with another optical fiber is introduced into the central cavity 19 of the coupling sleeve 3 from the left-hand side, the left-hand portions of the three leaf springs 21 are resiliently deflected outward in the same way. As a result, this second envelope is also clamped in the central cavity with its axis coincident with the axis of the central cavity and hence also coincident with the axis of the envelope 9 shown in FIG. 1. By sliding both envelopes into the coupling sleeve until the end faces 15 of the two optical fibers 7 contact each other, the fiber cores are optically coupled via these end faces.

FIG. 2 shows that the wall thickness of the housing 17 is comparatively large so that the housing is rigid in comparison with the leaf springs 21. Therefore, the three leaf springs 21 are independently resilient with respect to each other, so that the envelopes 9 are very accurately positioned.

Figure 3:
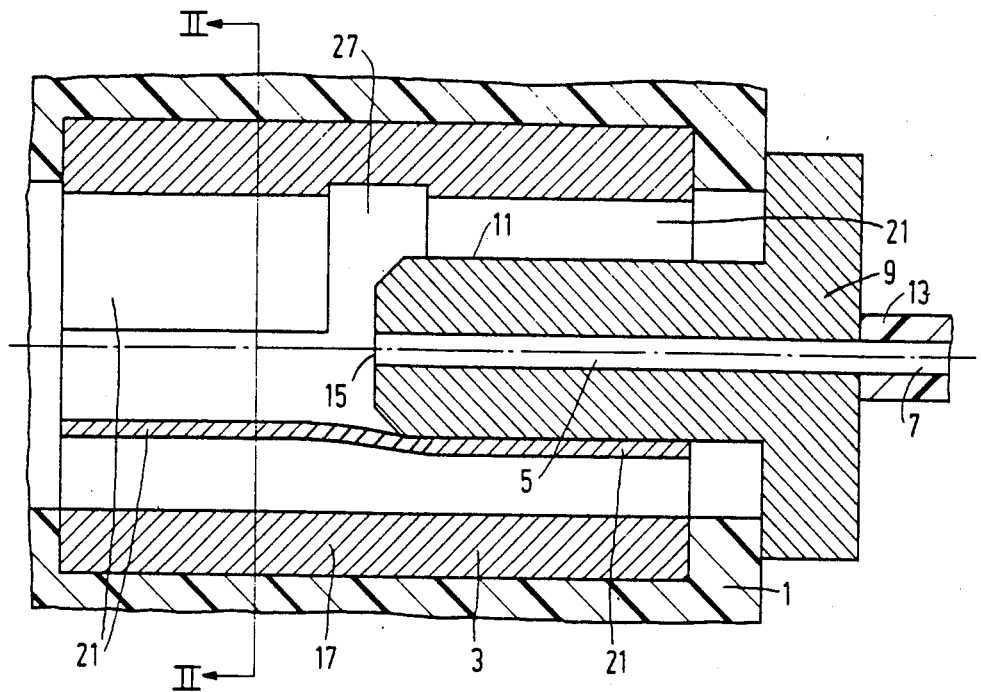
FIG. 3 is a longitudinal sectional view of an embodiment of a connector according to the invention shown accomodating an envelope of an end portion of an optical fiber.

As a result of the presence of the cuts 27, moreover, the two portions of each leaf spring are also independently resilient so that the accuracy of positioning is further increased. Thanks to this step, differences between the diameters of the outer surfaces of the two envelopes will not influence the accuracy of core alignment. However, it is to be noted that the cuts 27 may be omitted in some cases. See, e.g. FIG. 3.

As appears from FIG. 2, the coupling sleeve 3 is preferably made from a single piece of material. This can be achieved, for example by extruding it to the desired shape. Another suitable method of forming the coupling sleeve is by spark erosion of a solid rod. However, it is alternatively possible to manufacture the housing 17 and the leaf springs 21 separately, and to secure the leaf springs, for example, in axial slots in the inner wall of the housing by glueing or by welding.

When the material properties of the leaf springs 21 are constant over the entire length of the coupling sleeve, the spring characteristics will depend only on the dimensions of their cross-sections (notably their thicknesses). The force with which the envelopes are clamped in the coupling sleeve, therefore, also depends on this cross-section. Consequently, this force can be varied as desired by a suitable choice of the cross-section.

When the cross-sections of the three leaf springs deviate slightly from each other, the axes of the two envelopes will not coincide with the axis of the coupling sleeve. However, the deviation will be the same for both envelopes, provided that the cross-section of each spring is constant over the entire length of the coupling sleeve. As a result, the axes of the two envelopes will be aligned, even though the center of the circle 23 in FIG. 2 is no longer situated on these axes.

Only one coupling sleeve 3 is shown in the connector housing 1 of the described embodiment, and the envelope 9 accommodates only one optical fiber 7. However, each envelope may alternatively enclose a bundle of optical fibers so that a larger number of pairs of fibers will be coupled. The connector housing 1 may also comprise more than one coupling sleeve 3 for optical coupling more than one pair of optical fibers.

What is claimed is:

1. A connector for coupling at least one pair of optical fibers, each fiber having an end portion accommodated in an envelope, each envelope having a circularly cylindrical outer surface with a diameter, said connector comprising:
    a coupling sleeve having a longitudinal axis; and
    three leaf springs, each leaf spring having first and second opposite ends, said first ends being secured to the coupling sleeve at locations substantially regularly distributed around the longitudinal axis, each second end being resiliently displaceable in a radial direction with respect to the longitudinal axis, said leaf springs bounding a prism-shaped central cavity having a triangular cross-section through the longitudinal axis, the angles of the triangle all being approximately 60°, said cavity having a diameter equal to a diameter of a circle inscribed therein, the diameter of the cavity being less than the diameters of the envelopes around the optical fibers.

2. A connector as claimed in claim 1, characterized in that at approximately the middle of the longitudinal axis each leaf spring is divided from approximately the first end to the second end to form two leaf springs.

3. A connector as claimed in claim 2, characterized in that the coupling sleeve and leaf springs are made of a single piece of material.

4. A connector as claimed in claim 1, characterized in that the coupling sleeve and leaf springs are made of a single piece of material.

* * * * *